April 25, 1933.  C. H. JACOBS ET AL  1,905,986
BEVERAGE CARBONATING AND DISPENSING APPARATUS
Filed Sept. 5, 1930  3 Sheets-Sheet 3
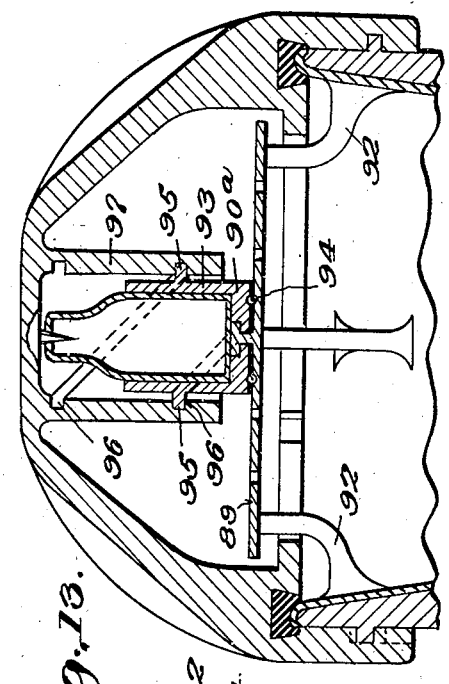
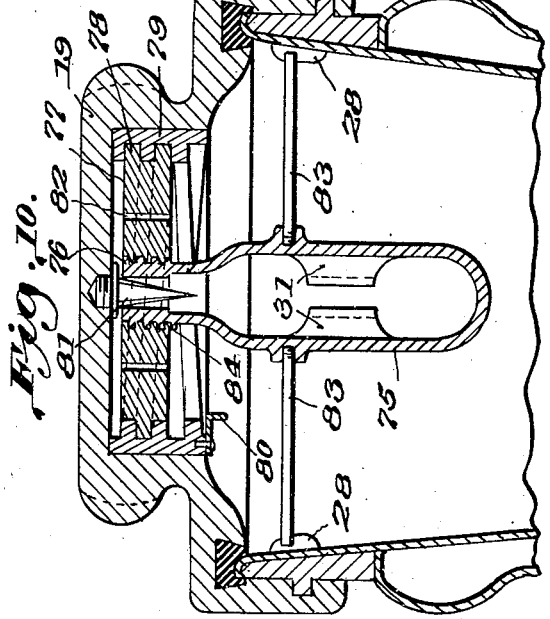
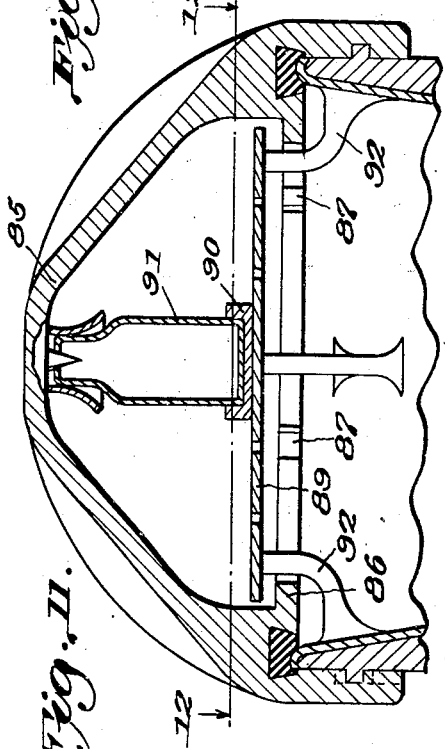
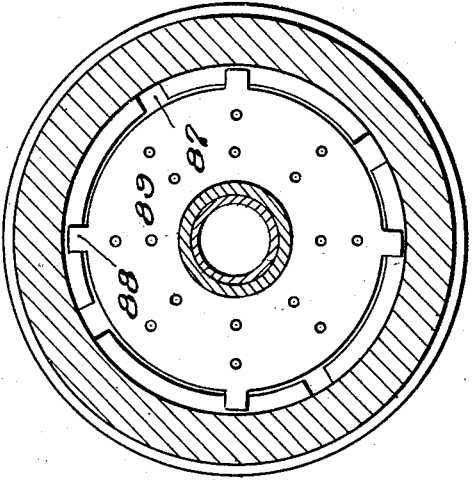
Inventor
CHARLES HUNTINGTON JACOBS,
EDGAR ROY NASH,
By L. D. Underwood
Attorney Patented Apr. 25, 1933

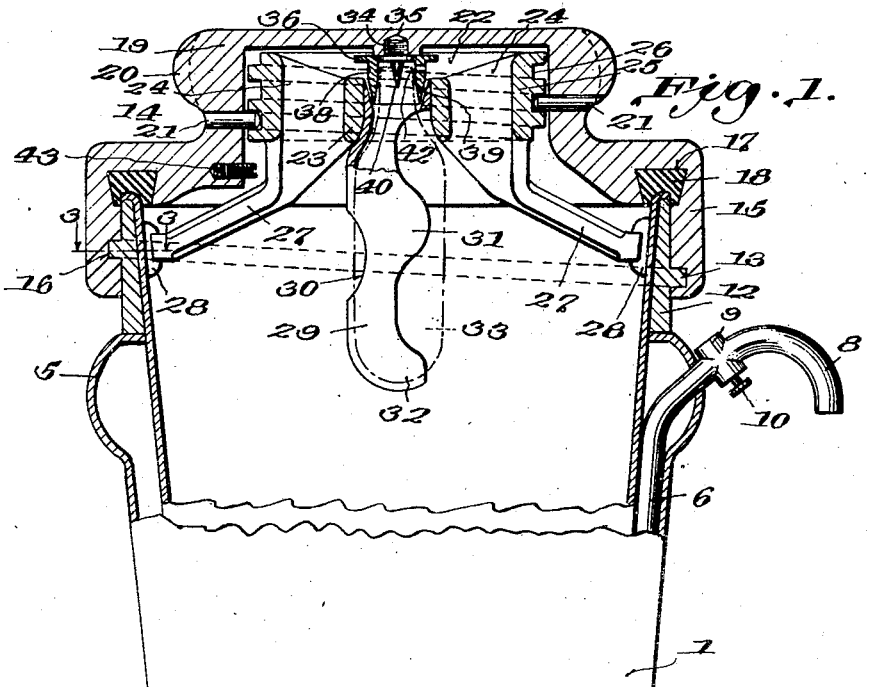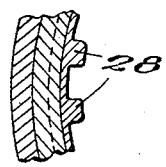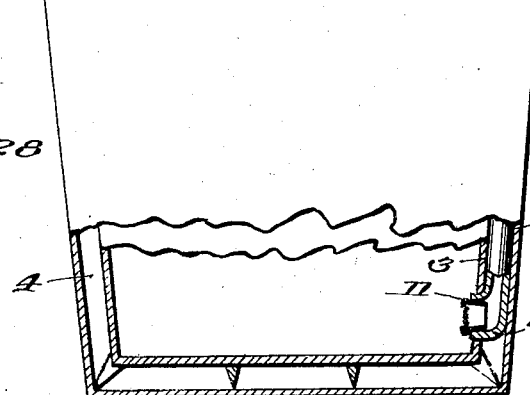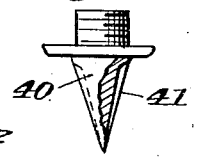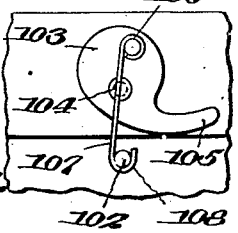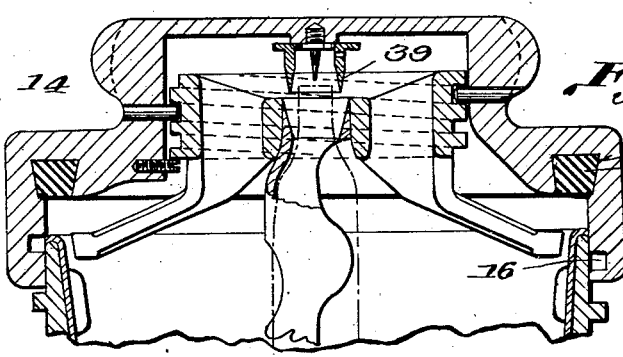
INVENTOR.
CHARLES HUNTINGTON JACOBS
EDGAR ROY NASH
BY
ATTORNEY

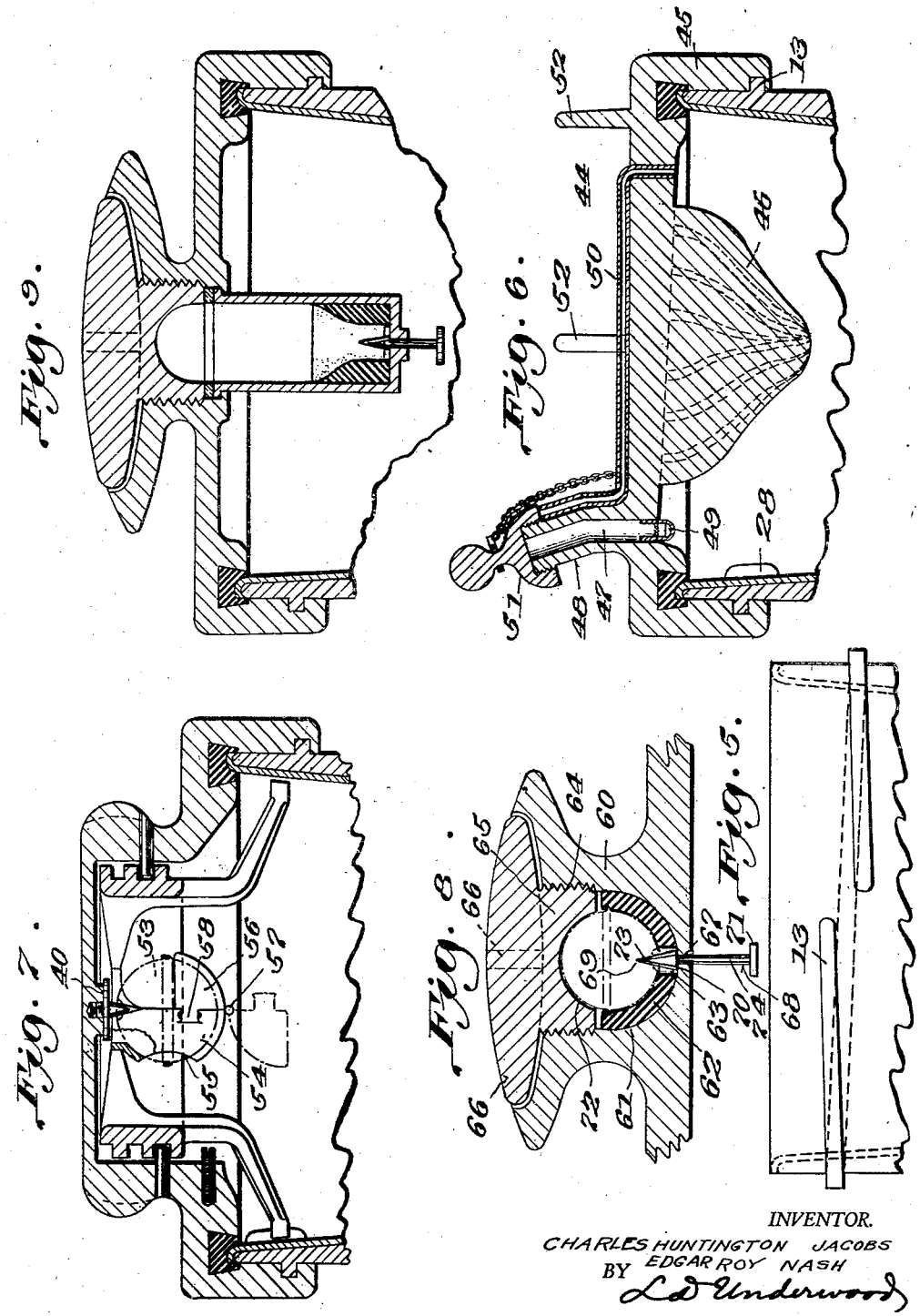

1,905,986

UNITED STATES PATENT OFFICE

CHARLES HUNTINGTON JACOBS AND EDGAR ROY NASH, OF SAN FRANCISCO, CALIFORNIA, ASSIGNORS TO SYPHONATOR COMPANY, LTD., A CORPORATION OF NEVADA

BEVERAGE CARBONATING AND DISPENSING APPARATUS

Application filed September 5, 1930. Serial No. 479,966.

The invention relates to containers for liquids and more particularly to containers for carbonating and dispensing beverages.

The primary object of the invention is to facilitate the preparation, or preparation and dispensing, of a variety of beverages in the home in an efficient way and at small cost. In the provision of apparatus to attain the primary object, secondary objects are to provide: (1) comparatively inexpensive means for carbonating beverages; (2) means whereby beverages may be carbonated under seal and out of contact with the air; (3) means whereby beverages may be retained at a desired temperature until used; (4) means whereby beverages may be dispensed from an air tight container as desired; (5) means permitting the use of lumps of water-ice as a refrigerating medium, if desired; (6) and an apparatus combining a thermos, or heat retaining feature, with a self-charging siphon and drink mixer, adapted to a wide variety of uses.

These objects are effected by means of the apparatus now to be described and illustrated in the accompanying drawings in which, Fig. 1 illustrates partly in side elevation and partly in section one embodiment of a combined thermos flask, carbonator, siphon, and drink mixer, employing a holder for a capsule of liquid carbon-dioxide.

Fig. 2 is a vertical sectional view of the closure member and mouth of the vessel or flask showing the closure member disengaged.

Fig. 3 is a horizontal section on line 3—3 of Fig. 1.

Fig. 4 is a detail of the piercing pin, showing the groove therein for conducting gas from the capsule into the interior of the vessel.

Fig. 5 is a fragmentary detail showing a thread on the upper outer face of the vessel for engagement by the closure member.

Fig. 6 shows another closure member equipped with a fruit reamer on its under side and a spout projecting from its upper side.

Fig. 7 is a vertical section through a modified form of closure member showing means for holding and piercing a dry-ice capsule.

Fig. 8 shows another modification of the means for holding and piercing a dry-ice capsule.

Fig. 9 shows a construction similar to that of Fig. 4 but adapted to a capsule of liquid carbon-dioxide.

Fig. 10 is a sectional view of the closure member equipped with another form of means for supporting and piercing the carbonating capsule.

Fig. 11 is a vertical cross section through the closure member showing modified means for holding and piercing a capsule and for engaging the closure member with the vessel.

Fig. 12 is a horizontal section on line 12—12 of Fig. 10.

Fig. 13 illustrates still another form of the capsule holder and piercing means.

Fig. 14 is a detail showing a modified means for engaging the closure member and vessel.

Fig. 15 (sheet 1) is a detail showing another modification of the means for engaging the closure member and vessel.

Referring to the drawings in detail in which the same reference numeral is used throughout to designate the same part, and first to Figs. 1 to 6 inclusive, we employ a vessel 1 preferably about the size of the ordinary drink mixer, having a wide, open mouth. In some aspects of the invention this vessel may have a single wall, but to realize our invention fully, it should be heat insulated, and is preferably formed of an outer wall 2 and an inner wall 3 spaced from the outer wall to form a vacuum jacket 4. The walls may be of any suitable material but the inner wall should be of sufficient strength to withstand, without breaking, the impact of lumps of ice placed therein when the vessel is shaken and the pressure exerted by the expansion of liquid carbon dioxide released therein in quantity sufficient to carbonate the contents thereof. Therefore both inner and outer walls are preferably formed of metal. As illustrated, the outer wall, is bulged outwardly at its upper end forming an annular protuberance 5 to more conveniently permit the egress of a discharge tube 6, situated between the walls 2 and 3, having its lower end 7 in communication with the bottom of the vessel, and its upper end extended outwardly through the protuberance 5 and bent downwardly, as indicated at 8. A normally closed valve 9, provided with an actuating button 10 is inserted in the discharge pipe adjacent the protuberance 5 and the outer end of the pipe extends to a point below this button so as to protect it from accidental operation. The lower end of the tube 6 is preferably partially closed by a strainer 11, which may be frictionally held and provided with a handle for convenient removal and cleansing. The upper end of the vessel adjacent its mouth must be of sufficient strength to withstand the strain incident to effecting an air-tight engagement therewith of a closure member and the rupturing of a carbonating capsule. As shown, the outer wall is extended to a point near the mouth of the vessel and is joined to a ring 12 surrounding and connected to the upper end of the inner wall, and is provided with means to interengage with means on a closure member to effect sealing engagement thereof with the mouth of the vessel. As shown in Fig. 1 this means consists of a single strong thread 13 of comparatively high pitch.

A closure member 14 is adapted to have an air-tight fit with the mouth of the vessel, and carries a holder for a capsule of carbonating material and means to release the carbonating medium into the interior of the vessel, and these elements may be widely varied in construction. As shown in Figs. 1 to 5, the closure member 14 is provided with a downwardly extending flange 15 having an internal screw thread 16 adapted to engage the external thread 13 on the upper end of the vessel. The horizontal web of the closure member is provided on its underside with an annular recess 17 filled with a resilient packing ring 18 adapted to engage the mouth of the vessel into which the latter is embedded to form an air-tight seal when the closure member is turned to its lowermost position. A central dome 19 projects upwardly from the closure member and may be provided with means to afford a firm grasp to the operator's hand, such as projecting fins or wings 20. Pins 21 are fixed in the dome and project inwardly, adapted to engage the threads of a capsule holder now to be described.

As shown in Figs. 1 and 2, the capsule holder 22, comprises a central, annular hub 23, from which radiate a plurality of arms 24, joined at their outer ends with a ring 25, fitting within the cavity of the dome. Externally the ring 25 is threaded, as shown at 26, to engage the pins 21. Projecting downwardly and outwardly from the holder are arms 27, whose free ends lie in the path of shoulders 28, projecting inwardly from the inner face of the vessel, whose function it is to prevent rotation of the holder when the closure member is rotated into sealing engagement. Therefore, they may be variously arranged, but as disclosed in Figs. 1, 2 and 3, they are formed in pairs, whereby the ends of the arms 27 may engage between them to prevent rotation in either direction. Substantially the same effect would be produced by spacing them singly around the vessel, except that a limited rotation of the holder might take place before it was stopped by one of the shoulders. Secured to hub 23 and depending therefrom is a sleeve 29 adapted to receive a capsule carrying a carbonating medium, as shown in Figs. 1 and 2. The sleeve 29 is contracted at its upper end and has an opening 30 at one side; it is cut away at the opposite side to form spring clips 31 leaving a bottom 32 of sufficient area to support a capsule 33 having a frangible end and containing liquid carbon-dioxide, as indicated in dotted lines in Fig. 1. In the center of the underside of the dome 19 is a screw-threaded recess 34 into which is threaded a bolt 35 carried on the upper side of a plate 36, from the underside of which extends downwardly an annular flange 38, wedge-shaped in cross-section at its extremity, as shown at 39, which fits between the neck of the capsule and the contracted portion of the holder. A piercing pin 40 projects downwardly from the central portion of the plate 36, and is provided with a groove 41 (see Fig. 4). The flange 38 is provided with one or more gas conducting apertures 42. The horizontal web of the dome is provided with an inwardly extending screw 43, adapted to limit the downward movement of the capsule holder, to prevent accidental removal thereof and properly position the parts to effect the rupturing of the capsule as hereinafter described.

*Operation.*—The apparatus so far described has a variety of uses which will be described hereinafter, but the mechanical manipulation of the parts in carbonating a beverage will now be set out. The closure member is removed from the vessel, and the capsule holder is rotated until the lower edge of the ring 25 engages the screw 43. A capsule 33 is then inserted into the sleeve 29. The closure member is then applied to the mouth of the vessel, as indicated in Fig. 2. Just prior to the threaded interlocking engagement between the closure member and vessel the ends of the arms 27 have entered between the shoulders 28, or are positioned in the path thereof, so that the capsule holder is prevented from rotating with the closure member. Rotation and downward movement of the closure member into sealing contact will therefore carry the piercing pin 40 downward, but concurrently the capsule holder will, by reason of the screw-threaded engagement between the holder and dome 19, move toward the piercing pin. The flange 38 centers the end of the capsule with respect to the piercing pin and holds the end of the capsule firmly, and approximately at the time the closure member comes into sealing contact with the mouth of the vessel the piercing pin will rupture the capsule and release the gas into the interior of the vessel, the gas passing through the groove 41 in the pin, the apertures 42, and down between the arms of the capsule holder. The gas permeates the liquid in the vessel and a pressure is created above the liquid by which it is expelled when the valve 9 is opened. It should be observed that the piercing pin rotates with a reaming action as it enters the capsule. When the cover is removed, the capsule may be readily withdrawn by exerting sidewise pressure against it through the opening 30.

For the purpose of conveniently preparing and dispensing fruit beverages, which may be carbonated with the apparatus above described if desired, another closure member is provided for the vessel 1 which is illustrated in Fig. 6. This closure member 44 is provided with a downwardly extending flange 45 internally screw-threaded to cooperate with the external thread 13 on the vessel 1. The underside of the closure member 44 carries a fruit reamer 46 of well known form. A protuberance extends from the upper side of the closure member, and the closure member and protuberance are bored, as indicated at 47, to form a spout 48, the lower end of the bore being partially closed by a strainer 49. A vent pipe 50 extends through the closure member and alongside the spout to within a short distance of its end. The end of the spout is threaded to receive a detachable cap 51 whose margin closes the end of the vent pipe when screwed home. The fruit reamer cover is so constructed that when it is in use to ream fruit the upper side thereof will rest on the mouth of the vessel 1 while the spout 48 depends within the vessel to strain the fruit juice and conduct it into the vessel. To facilitate the flow of the juice the surface surrounding the reamer is inclined toward the spout. In order to prevent rotation of the reamer while in use the upper side of the closure member is preferably provided with arms 52 which are adapted to engage the lugs 28 in the vessel. The spout 48 serves the double function of conducting fruit juices into the vessel during the reaming operation, and to convey liquid from the vessel when it is dispensed. The purpose of the vent pipe 50 is to admit air to the vessel when its contents are being discharged through the spout 48, and it is closed by the cap 51 to prevent the contents of the vessel from spurting out when it is shaken and to prevent the ingress of air and heat while the contents are awaiting use.

This closure member is preferably employed when the vessel is not used as a siphon.

According to the above description the use of a capsule of liquid carbon-dioxide is contemplated as the carbonating medium. But solid carbon-dioxide snow or "dry ice" also may be employed and with considerable advantage as to cost, and Figs. 7 and 8 illustrate this form of carbonating medium. In Fig. 7 the construction is the same as in Figs. 1 and 2 except as to means for carrying the capsule and the capsule piercing means. In this case carbon-dioxide snow is enclosed in a metal container having a portion constructed for rupturing by a piercing pin. The container may be of any shape, but as shown it is in the form of a ball 53. The holder carries a hemispherical shell 54, having a hole 55 to permit pressure to be exerted on the capsule in removing it. A segment 56 is hinged at 57 to the lower edge of the shell 54 and the edge of the segment carries a spring clip 58 which engages a shoulder on the other hinged part to hold the spherical capsule in place. A piercing pin 40 projects downwardly from a central part of the closure member, but no guiding or centering means is employed as in the construction shown in Fig. 1. Other than as indicated this form is substantially the same as that shown in Fig. 1.

Fig. 8 illustrates another means for carbonating with dry ice. In this form the gas is not released automatically by the attachment of the closure member, as in the forms previously described, but by a separate means after the closure member has been applied. In this form a central knob 60 projects from the upper side of the closure member which is recessed to receive a dry-ice capsule and a plug to effect the release of gas. The bottom of the recess is hemispherical, as indicated at 61, and is lined with a resilient packing 62 of rubber or the like, provided with an opening 63 at its lowermost point. Above the packing 62 the recess is threaded, as indicated at 64 to receive an externally threaded plug 65 provided at its upper end with a convenient hand hold, such as radial wings 66. An opening 67 extends from the bottom of the recess 61 through the closure member in which fits a sliding pin 68 surmounted by a conical piercing point 69. The junction of the base of the piercing point 69 with the sliding pin 68 provides an annular shoulder 70 which normally rests on the closure member at the margin of the opening 67. The pin 68 is provided at its lower end with an operating button 71. The lower end of the plug 65 is provided with a hemispherical recess 72 which, with the hemispherical recess in the packing 62, forms a spherical recess adapted to receive a spherical dry-ice ball. The dry-ice ball consists of a metallic shell enclosing a ball of dry-ice, the shell, at one point, having a rupturable indentation 73 adapted to engage the piercing point 69. The pin 68 has a passageway 74 extending longitudinally therethrough to conduct gas from the dry-ice ball into the vessel. In the use of this embodiment the plug 65 is withdrawn and a dry-ice ball is seated on the packing 62 with the recess in the ball resting on the piercing point 69. The plug is then inserted and turned down until the piercing point ruptures the dry-ice shell. The dimensions of the packing, plug, and dry-ice ball are so selected that space is provided for the displacement of the packing to permit the descent of the ball a distance sufficient to effect its rupture by the pin. The parts remain in this position until the ice has been transformed into gas which passes into the vessel through the passageway 74 in the sliding pin 68. The shell of the dry-ice ball may be removed by withdrawing the plug 65 and then pushing on the button 71 of the sliding pin 68 until the shell is in position to be engaged by the hand and released from the sliding pin.

The embodiment shown in Figure 9 is the same as Fig. 8 except that it is adapted to a bottle-shaped capsule of liquid carbon-dioxide. In this form a cylindrical capsule holder depends from the closure member, the lower part of which contains resilient packing shaped to conform to the capsule inserted therein and adapted to permit descent of the capsule over the piercing point. The principle is the same as the embodiment illustrated in Fig. 8 above described and requires no further description.

The embodiment shown in Fig. 10 is the same as shown in Fig. 1 in respect to the means of attaching the closure member to the vessel, the shoulders 28 projecting from the upper inner face of the vessel, the shape of the dome 19, and the recess on the underside thereof. In this embodiment the capsule holder comprises a sleeve 75 adapted to receive a bottle-shaped capsule of liquid carbon-dioxide, but it may be made in any shape, adapted to receive a capsule of liquid carbon-dioxide or carbon-dioxide snow. The upper end of the sleeve is contracted and is provided with external screw threads 76 of low pitch, threaded into a disk 77 provided with peripheral external screw threads 78 engaging with the internal threads of a ring 79 fixed to the dome 19. A stop-plate 80 is pivoted to the ring 79 for limiting the downward motion of the disk 77. A piercing pin 81 is fixed to, and depends from, the central portion of the dome 19, this pin being the same as piercing pin 40 except that it is longer than the latter. The disk 77 is provided with apertures 82 to permit gas emerging from the groove in the pin 81 into the space above the disk to pass downwardly into the vessel 1. Arms 83 are fixed to the sleeve 75 and extend radially therefrom into the path of the shoulder 28 on the inner face of the vessel. The operation of this embodiment is substantially the same as that shown in Figs. 1, 2 and 7. The capsule-holding sleeve has a threaded engagement with the part which supports it, but there is sufficient friction between the threads in the sleeve and the disk 77 and a shoulder 84 at the base of the threaded portion to prevent relative rotation between the sleeve and disk under normal conditions, so that the disk, under normal conditions, moves toward the piercing pin when the cover is applied and away from it when the cover is removed. However, should there be any obstruction to the turning of the disk in the ring 79 in removing the closure member, as by the presence of material caught in the internal threads of the ring, the closure member may still be removed, as the disk 79 will then turn with the dome 19 about the capsule-holding sleeve. The same danger of obstruction is not present in the embodiment shown in Figs. 1, 2 and 7, as the pins 21 are employed to perform the function of the internally threaded ring 79 of Fig. 10.

Figs. 11 and 12 show another modification of means for holding a capsule of liquid carbon-dioxide and releasing it into the vessel 1. In this case the closure member 85 is in the shape of a conical shell provided with an inwardly extending shoulder or flange 86 having slots 87 spaced about its circumference which permit the passage therethrough of lugs 88 on the periphery of a perforated disk 89. Centrally secured on the disk 89 is a circular dish-shaped support or saddle 90 adapted to receive the base of a frangible capsule 91 having a contracted upper end. A piercing pin and guide depend from the underside of the closure member above the saddle 90. Secured to the inner face of the vessel near the mouth are a plurality of circumferentially disposed arms 92 extending inwardly and upwardly above the upper edge of the vessel.

The embodiment shown in Fig. 13 is similar to that shown in Figs. 11 and 12, except that provision is made for effecting rotation of the capsule when the closure member is applied. In this case the saddle 90 is in the form of a cylindrical shell 93, and it is pivoted at its base to the perforated disk 89, ball bearings 94 being interposed between said base and the disk 89. Pins 95 project outwardly from the cylinder 93 and engage in spiral grooves 96 formed in the inner wall of a cylindrical shell 97 depending from the top of the closure member.

In the embodiments shown in Figs. 11 and 13, when it is desired to withdraw a used capsule, the disk 89 is rotated until the lugs 88 on disk 89 register with the slots 87 in flange 86, whereupon the disk 89 and capsule supporting saddle may be moved downwardly past the flange 86. A loaded capsule may then be put in the place of the used one on the saddle, and the disk be reinserted. It may be observed that the lugs 88 of the disk carrying the loaded capsule will rest on the flange 86 with the upper end of the capsule out of engagement with the piercing pin until the closure member is applied and is about to engage with the interlocking means on the vessel. The disk 89 will then rest on the ends of the upstanding arms 92 with the end of the piercing pin lightly engaging the end of the capsule. Thereafter, interlocking the closure member with the vessel and bringing them into sealing engagement, forces the piercing pin into the capsule and releases the gas. The interlocking means between closure and vessel shown in the other figures may be used in these modifications, but we have shown in these figures and in Fig. 14 another modification consisting of pins 98 projecting outwardly from diametrical points near the top of the vessel which are adapted to enter slots in the closure member (clearly shown in Fig. 14) consisting of an entrant portion 99, an inclined mediate portion 100, and a locking portion or recess 101. Like the other interlocking means this means requires rotation of the closure, but in Fig. 15 (sheet 1) we show a modification of this interlocking means which consists of pins 102 on the vessel and means to cam the closure into sealing engagement. The camming means is mounted on the closure and, as shown, consists of a disk 103, eccentrically pivoted at 104 to the flange of the closure and provided with an operating finger 105. A pin 106 is secured near the periphery of the disk to which a link 107 is pivoted, provided with a hook 108 at its free end, adapted to engage the pin 102. When the cam is moved into locked position the pin 106 passes beyond the dead center of the pivot 104 and holds the closure in locked position. This interlocking means does not effect rotation of the closure and the piercing pin to give it a rotating or reaming action on the capsule, but such relative rotation of the piercing pin and capsule may be secured in other ways, as, for example, by the means shown in Fig. 13.

Although we have indicated the use of solid carbon-dioxide snow as a carbonating medium, it may also constitute a refrigerating medium if used in sufficient quantity, and its use as such is also contemplated as part of our invention, and the term "carbonating medium" as used in the claims is intended to include "dry-ice" as both a carbonating and refrigerating medium.

From the above description it may be appreciated that we have provided a combination apparatus capable of wide application to mixing, carbonating and dispensing beverages, and preserving them or other objects at a desired temperature. For example, the same vessel may be used to carbonate water and dispense the carbonated water at will as additions to other beverages. Or a beverage may be placed in the vessel at a desired temperature or with ice and then carbonated, and by reason of the heat insulated walls, be retained at a desired temperature and dispensed from time to time. The same vessel may be used as an ordinary mixer, and it may be used as a substitute for a thermos bottle to maintain the temperature of hot and cold liquids, and also as a thermos vessel adapted to maintain the temperature of non-liquid substances, the open mouth permitting the insertion and removal of the latter; the siphon tube, being concealed in the walls of the vessel, offers no obstruction. So far as we are aware, no one heretofore has constructed or disclosed a device by which a beverage may be carbonated, under seal, retained in a sealed condition at a desired temperature, and dispensed from time to time, all the while maintaining it in the condition in which it possesses a maximum of its best characteristics; or a device in which a beverage may be placed with lumps of ice and then carbonated and maintained at substantially the same temperature for a considerable period.

While we have described the best form so far discovered by us for embodying the invention, and have disclosed some modifications, it is to be understood that such disclosure has for its purpose only to illustrate the principles involved and a form in which they may be successfully embodied, and that our invention is not confined to the constructions disclosed but includes all changes, modifications, or additions within the principles set out and falling within the scope of the appended claims.

What we claim is:

1. Apparatus for preparing and dispensing beverages comprising a vessel substantially unobstructed interiorly, with heat insulated walls and a wide, open mouth, a closure member therefor adapted to be sealed against said mouth, interengaging means between the closure member and vessel to effect air-tight sealing engagement thereof, means connected with the closure member for carbonating a liquid contained in the vessel while the closure member is sealed against said mouth, and means for dispensing a beverage from said vessel without removal of the closure member.

2. A beverage mixer and carbonator comprising a vessel with heat insulated walls and a wide, open mouth, a closure member adapted to be seated on said open mouth, interengaging means between the body of the vessel and the closure member for sealing said member air-tight against the mouth, a holder mounted on said closure member adapted to receive and hold a capsule carrying a carbonating medium, means to release said carbonating medium into said vessel, and a discharge tube communicating with the interior of the vessel provided with means outside the vessel to control the flow of liquid therefrom.

3. A beverage mixer and carbonator comprising a double-walled vessel having a wide, open mouth, a closure member adapted to be seated on said open mouth, interengaging means between the body of the vessel and the closure member for sealing said member air-tight against the mouth, a holder mounted on said closure member adapted to receive and hold a capsule carrying a carbonating medium, means to release said carbonating medium into the vessel, a discharge tube located between the walls of the vessel communicating with the interior of the vessel at the bottom and passing out of the vessel near the top, and means near the outer end of said tube to control the discharge from said vessel.

4. A beverage mixer and carbonator comprising a vessel with a wide, open mouth, a closure member adapted to be seated on said open mouth, a holder within said vessel adapted to receive and hold a capsule carrying a carbonating medium, means for liberating the carbonating medium from the capsule, interengaging means between the vessel and closure member for sealing the closure member air-tight against the open mouth, and means, actuated by the motion of the closure member into sealing contact to cause relative vertical and rotational movement between the capsule and liberating means, to pierce the capsule and release the carbonating medium.

5. A beverage mixer and carbonator comprising a vessel with an open mouth, a closure member adapted to be seated on said open mouth, interengaging screw threads on the closure member and vessel for sealing the member against said mouth, a holder carried by said closure member adapted to receive and hold a frangible capsule carrying a carbonating medium, said holder having a screw-threaded engagement with the closure member, means carried by the closure member for piercing the frangible capsule, interengaging means between the capsule holder and the vessel to prevent rotation of the holder when the closure member is turned into sealing engagement whereby, upon rotation of the closure member, the piercing means and capsule are brought into engagement to pierce the capsule and release the carbonating medium.

6. A beverage mixer and carbonator comprising a vessel with an open mouth, a closure member adapted to be seated on said open mouth, interengaging screw threads on the closure member and vessel for sealing the member against said mouth, a holder for a frangible capsule carrying liquid carbon-dioxide, said holder having a screw-threaded engagement with the closure member, means carried by the closure member for piercing the frangible capsule, interengaging means between the capsule holder and the vessel to prevent rotation of the holder when the closure member is turned into sealing engagement whereby, upon rotation of the closure member, the piercing means and capsule are brought into engagement to pierce the capsule and release the gas, and means for centering the capsule with respect to the piercing means.

7. A beverage mixer and carbonator comprising a vessel with an open mouth, a closure member adapted to be seated on said open mouth, interengaging means between the body of the vessel and the closure member for sealing said member air-tight against said open mouth, a holder mounted on said closure member adapted to receive and hold a frangible capsule carrying a carbonating medium, a sliding pointed pin beneath the holder, means to press the capsule onto the point of the pin to rupture the capsule, and means to convey gas escaping from the capsule into the vessel.

8. A beverage mixer and carbonator comprising a vessel with an open mouth, a closure member adapted to be seated on said open mouth, interengaging means between the body of the vessel and the closure member for sealing said member air-tight against said open mouth, a holder mounted on said closure member including a compressible cushion adapted to receive and hold a frangible capsule carrying a carbonating medium, a sliding pointed pin beneath the holder, means to press the capsule onto the point of the pin to rupture the capsule, and means to convey gas escaping from the capsule into the vessel.

9. Apparatus for preparing carbonated fruit beverages comprising, in combination, a vessel having an open mouth, a closure member therefor, interengaging means between the body of the vessel and closure member for sealing said member air-tight against said mouth, a holder carried by said closure member adapted to receive and hold a frangible capsule containing a carbonating medium, means on the closure member to liberate the carbonating medium into the vessel, a second closure member having engaging means identical with the engaging means on the first closure member adapted to seal it against the mouth of said vessel in one position and to rest thereon when in an inverted position, a fruit reamer on the underside of said second closure member, and means to convey fruit juices into the vessel.

10. A closure member for a beverage mixer comprising means adapted to cooperate with means on a vessel to seal it against the mouth of such vessel, a fruit reamer centrally located on the underside of said member, a spout projecting from the upper side thereof provided with a passageway extending through the member, a detachable cap for the end of the spout, and a vent opening extending through said member.

11. A closure member for a beverage mixer comprising means adapted to cooperate with means on a vessel to seal it against the mouth of such vessel, a fruit reamer centrally located on the underside of said member, a spout projecting from the upper side thereof provided with a passageway extending through the member, a detachable cap for the end of the spout, a vent pipe passing through the member and extending alongside the spout, and a detachable cap for closing both the spout and vent pipe.

12. A beverage mixer comprising a vessel with an open mouth, a closure member adapted to be seated on said open mouth, interengaging means on the vessel and the closure member to seal the member air-tight against said mouth, shallow shoulders projecting inwardly from the inner face of the vessel near the mouth, a fruit reamer projecting from the underside of the closure member, a passageway leading through the closure member, and arms projecting from the upper side of the closure member adapted to cooperate with the shoulders on the inner face of the vessel to prevent rotation of the fruit reamer in the act of extracting the fruit juice.

13. A beverage mixer comprising a vessel, a discharge tube communicating with the interior of said vessel and having its outer end bent downwardly, and a control valve in an intermediate portion of said tube having its operating part protected by the overhang of the tube whereby said valve is prevented from accidental operation.

14. A beverage mixer and carbonator comprising a vessel having heat-insulated walls and with a wide, open mouth, a closure member adapted to be seated on said open mouth, a holder within said vessel adapted to receive and hold a capsule carrying a carbonating medium, means on the closure member for rupturing the capsule and liberating the carbonating medium therefrom, interengaging means between the vessel and closure member for sealing the closure member airtight against the open mouth, and means, actuated by the motion of the closure member into sealing contact, to actuate said rupturing means, and means for discharging the carbonated liquid without removing the closure member.

15. The combination specified in claim 14 in which the discharge tube is concealed in the wall of the vessel.

Signed by us this 2nd day of September, 1930.

CHARLES HUNTINGTON JACOBS.
EDGAR ROY NASH.